(No Model.)
H. R. CASSEL.
APPARATUS FOR SEPARATING METALS FROM ORES OR ALLOYS.
No. 360,853. Patented Apr. 12, 1887.
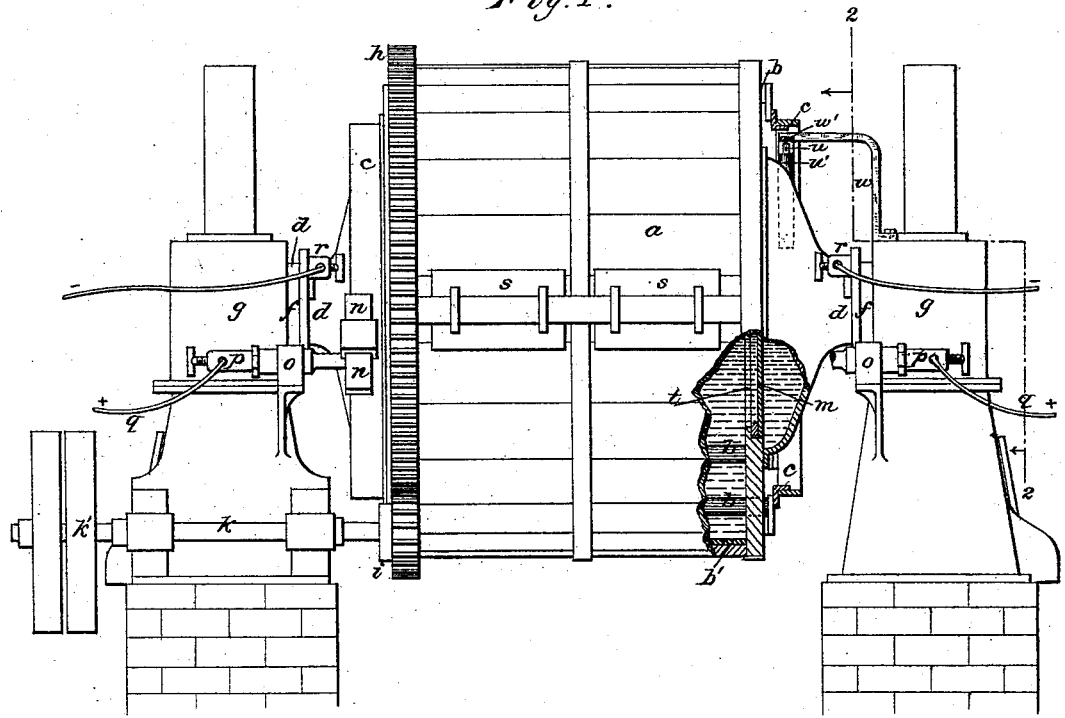
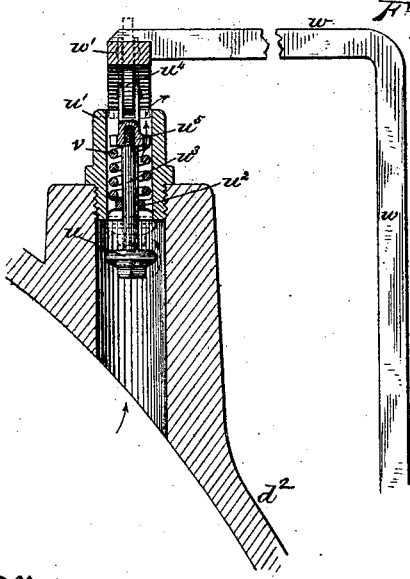
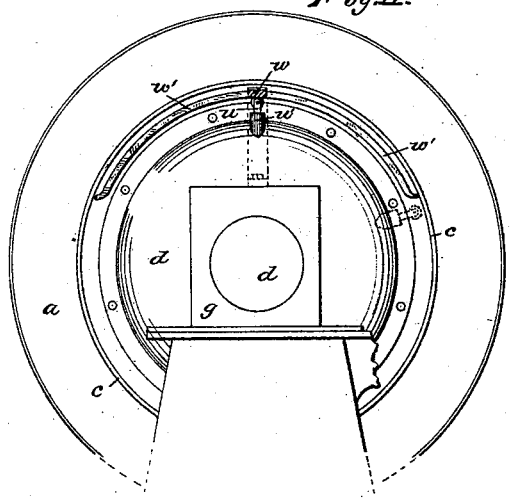
Witnesses
Harry King
Robt. E. Mattingly
Inventor
Henry R. Cassel
By his Attorney
J. C. Somes

UNITED STATES PATENT OFFICE.

HENRY RENNER CASSEL, OF NEW YORK, N. Y., ASSIGNOR TO THE CASSEL GOLD EXTRACTING COMPANY, (LIMITED,) OF GLASGOW, SCOTLAND.

APPARATUS FOR SEPARATING METALS FROM ORES OR ALLOYS.

SPECIFICATION forming part of Letters Patent No. 360,853, dated April 12, 1887.

Original application filed March 8, 1886, Serial No. 194,471. Divided and this application filed October 6, 1886. Serial No. 215,463. (No model.) Patented in England July 15, 1885, No. 8,574.

*To all whom it may concern:*

Be it known that I, HENRY RENNER CASSEL, a citizen of the United States of America, residing at New York, in the county and State of New York, metallurgist, have invented a new and useful Improvement in Apparatus for Separating Metals from Ores or Alloys, (for which I have obtained a patent in Great Britain, No. 8,574, dated July 15, 1885,) of which the following is a specification.

This invention relates to an apparatus for separating metals from ores or alloys, and especially auriferous compounds, by electrolysis, in which the metals are dissolved at the positive pole, separated from the ore or alloy within the electrolytic bath, and deposited at the negative pole at one and the same operation. The most powerful solvent which can be produced on a large and commercial scale for gold and most other metals is chlorine, and this can be easily generated by electrolyzing a solution of common salt. The chlorine and oxygen are set free at the anode, and if this pole be of metal it will be readily dissolved, and the dissolved metal will be carried over to be deposited at the cathode; but if the anode be composed of carbon any particle of metal coming in contact therewith during electrolysis will also be readily dissolved.

Gold ores containing antimony, sulphur, arsenic, tellurium, bismuth, and many other compounds, called "refractory" or "rebellious," are also commonly designated as "pyrites." Their treatment offers great difficulty, and it is usual to roast or calcine them in order to oxidize the sulphur, arsenic, antimony, &c., and so set the gold free. In the electrolytic process roasting or calcining of the ores is unnecessary, as the nascent chlorine and oxygen are the means of oxidizing the pyrites and setting the gold free, which is then converted into auric chloride, and when lime is added, as explained in my previous patent of the United States, numbered 300,951, dated June 24, 1884, the gold is deposited at the cathode in the form of a black slime.

In the accompanying drawings, Figure 1 is a side elevation of this improved apparatus. Fig. 2 is an end elevation thereof, partly in section, on line 2 2 of Fig. 1. Fig. 3 is a detail of the valve connected with the rotary drum and of the means for automatically actuating said valve.

Similar letters of reference indicate corresponding parts in the different figures.

A rotary drum, $a$, preferably constructed of wood, constitutes a part of this apparatus. If constructed of metal, the drum must be thoroughly insulated inside. This drum is provided on its interior with carbon anodes, $b$, which are preferably in the form of rods extending longitudinally of the drum from end to end thereof. If desired, the anodes may be in the form of plates, and the entire interior face of the drum may be lined with carbon or plumbago, as shown at $b'$. I use carbon for the anodes for the simple reason that metals would be immediately attacked and dissolved by the chlorine developed during the operation. The ends of the rods $b$ extend through the ends of the drum to effect connection with the positive pole of the source of electricity. Rubber cement, marine glue, or other suitable compound is employed to effect a tight joint between the rods and the heads of the drum. The projecting ends of the carbon rods are preferably provided with a metallic coating, or with metallic caps, and are connected with each other by a metallic band or rod, $c$, which is soldered or otherwise secured to said ends. The drum may be provided with one or more rows of carbon rods, and when two or more rows are employed they must be suitably connected. This drum is connected at its opposite ends to two hollow metallic shafts or trunnions, $d$, which are supported in bearings in upright hollow standards, $g$, which serve as tanks. The inner ends of the shafts $d$ are preferably flaring or bell-shaped, and the ends of the drum $a$ are provided with openings $t$, opposite the bell-shaped ends of the shaft, whereby communication may be effected between the shafts, tanks, and drum. Each of these openings $t$ is covered with an asbestus-cloth diaphragm, $m$, or other suitable porous material, which is securely fastened over the opening by means of flanges and screws. The shafts $d$ pass near their outer ends through stuffing-boxes, $f$, and are provided with holes opening into the tanks. The asbestus-cloth diaphragms divide the anode from the cathode compartments, and prevent the escape of the crushed ore from the drum, but permit the passage of the electric current and of the metals in solution from the drum into the hollow shafts and tanks which constitute the cathode-compartments.

The rotary drum is provided with a hand-hole or opening, which is closed by a cover, $s$, the joint being preferably provided with a rubber packing to prevent leakage. A cog-wheel, $h$, fixed to the drum, meshes with the pinion $i$ on the driving-shaft $k$, said shaft being actuated by the driving-pulley $k'$.

One of the trunnions $d$ is provided with a radial tubular projection, $d^2$, to the outer end of which is attached a tubular valve-casing, $u'$, carrying an automatic valve, $u$. The valve-casing is provided near its lower end with an eye, $u^2$, through which the valve-stem $u^3$ of the valve $u$ slides. The valve-stem is provided with a collar, $u^5$, near its outer end, and a spiral spring, $v$, is inclosed within the casing between said collar and said eye, which spring acts expansively to hold the valve $u$ in contact with its seat at the lower end of the valve-casing. The valve-stem projects beyond the outer end of the valve-casing, and is preferably provided with an anti-friction roller, $u^4$. A bracket, $w$, attached to one of the standards $g$, carries an arc-shaped arm, $w'$, which is arranged in the path of the roller $u^4$ of the valve $u$. In the rotation of the trunnion, when the valve is on the upper side thereof, above the level of the liquid in the apparatus, the roller comes in contact with the arc-shaped arm $w'$, whereby the valve is depressed and opened, permitting the gases to escape. The valve is held open until it has passed down in its rotation with the trunnion to near the level of the liquid therein, whence it will be released from the arc-shaped arm, and the spring will cause it to be seated and closed, and it will remain closed during its passage through the lower half of its circuit, so that the liquid in the trunnion cannot escape.

The electric current is conveyed to the anodes by means of brushes or rollers $n$, which are fastened in brackets $o$, attached to the standards $g$, and bear upon the metallic rod or band $c$, connecting the anodes. These brushes are properly insulated, and are connected at $p$ with one pole of the source of electricity by wire $q$. The other pole of the apparatus is connected with the shaft $d$ or standards $g$, at $r$, so that both shaft and standards form the negative pole in the apparatus.

The operation is as follows: The apparatus being filled to a point at or above the level of the shaft $d$ with the electrolyte composed of common salt-water, the drum is charged with the pulverized ores through the hand-hole, which is then tightly closed by the hand-hole plate $s$. The drum is then set in motion and the current switched on, the latter being conveyed by wire $q$ to the brushes $n$, band $c$, and carbon anodes $b$, then through the electrolyte to the diaphragms, through the diaphragms into the trunnions, thence to the standard tanks $g$, and back to the battery or source of electricity. The metals in the pulverized ores are constantly thrown against the anodes when the drum is revolving, thus forming frequently a part of the anode itself, and are thereby brought into most intimate contact with nascent chlorine and oxygen generated at the positive pole, whereby they are readily dissolved. The metal in solution passes through the asbestus-cloth diaphragms, and is deposited electrolytically within the trunnions and in the tanks $g$ in the form of a black slime, whence it can easily be collected for smelting.

Hydrogen is generated from the decomposition of the water at the negative pole, and to permit this to escape, and also to prevent polarization, and, further, to allow any slime which may accumulate to be withdrawn, the cathode-compartments are provided with automatic valves, such as that hereinbefore described, or its equivalent.

Several of these apparatuses may be placed in circuit.

I claim as my invention—

1. In an apparatus for separating metals from ores or alloys by electrolysis, the combination of a journaled drum constituting an anode-compartment provided with carbon anodes and a suitable electric connection, tubular cathode-compartments extending from opposite ends of said drum serving as a support and axis therefor and provided with a suitable electric connection, and porous diaphragms separating said anode and cathode compartments, substantially as described.

2. In an apparatus for separating metals from ores or alloys by electrolysis, the combination of a journaled drum provided with carbon anodes and constituting the anode-compartment, tubular trunnions extending from opposite ends of said drum, and hollow standards in which said trunnions have their bearings, said trunnions and standards serving as cathode-compartments, porous diaphragms separating the anode and cathode compartments, and suitable electric connections, substantially as described.

3. In an apparatus for separating metals from ores or alloys by electrolysis, the combination of a journaled drum constituting the anode-compartment provided with carbon anodes having a suitable electric connection and with enlarged openings at its opposite ends, tubular shafts or trunnions constituting the cathode-compartments having enlarged inner ends surrounding said openings, and porous diaphragms covering said openings, substantially as described.

4. In an apparatus for separating metals from ores or alloys by electrolysis, the combination of a rotary drum constituting the anode-compartment provided with carbon anodes having a suitable electric connection and with enlarged openings at its opposite ends, tubular shafts or trunnions having enlarged inner ends surrounding said openings, porous diaphragms covering said openings, and hollow standards in which said trunnions have their bearings, said trunnions being in communication with the interior of said drum and standards and said trunnions and hollow standards constituting cathode-compartments and being provided with suitable electric connections, substantially as described.

5. In an apparatus for separating metals from ores or alloys by electrolysis, the combination of a rotary drum, constituting an anode-compartment and having a suitable electric connection, a rotary cathode-compartment provided with an automatic valve, a porous diaphragm separating said anode and cathode compartments, and means for intermittently actuating said valve to permit the escape of the gases, substantially as described.

6. In an apparatus for separating metals from ores or alloys by electrolysis, the combination of a rotary drum constituting the anode-compartment and having a suitable electric connection, a rotary cathode-compartment having a suitable electric connection and provided with an automatic valve, a porous diaphragm separating said anode and cathode compartments, a fixed bracket, and an arc-shaped arm attached to said bracket in the path of said valve for opening of the latter, substantially as described.

HENRY RENNER CASSEL.

Witnesses:
ALFRED PAGELOW,
DAVID MURRAY.